United States Patent
Wyrsta (10) Patent No.: US 11,566,304 B2
(45) Date of Patent: Jan. 31, 2023

(54) METHODS FOR RECOVERING COPPER, COBALT, INDIUM AND NICKEL WITH AMINE CONTAINING LIXIVIANT

(71) Applicant: LIXIVIA, INC., Santa Barbara, CA (US)

(72) Inventor: Michael D Wyrsta, Santa Barbara, CA (US)

(73) Assignee: Lixivia, Inc., Santa Barbara, CA (US)

( * ) Notice: Subject to any disclaimer, the term of this patent is extended or adjusted under 35 U.S.C. 154(b) by 173 days.

(21) Appl. No.: 16/647,337

(22) PCT Filed: Sep. 14, 2018

(86) PCT No.: PCT/US2018/051050
§ 371 (c)(1),
(2) Date: Mar. 13, 2020

(87) PCT Pub. No.: WO2019/055766
PCT Pub. Date: Mar. 21, 2019

(65) Prior Publication Data
US 2020/0277683 A1 Sep. 3, 2020

Related U.S. Application Data (60) Provisional application No. 62/558,785, filed on Sep. 14, 2017.

(51) Int. Cl.
| | | |
|---|---|---|
| *C22B 3/00* | (2006.01) | |
| *C22B 3/16* | (2006.01) | |
| *C22B 15/00* | (2006.01) | |
| *C22B 58/00* | (2006.01) | |

(52) U.S. Cl.
CPC .......... *C22B 3/1625* (2013.01); *C22B 3/165* (2013.01); *C22B 15/0067* (2013.01); *C22B 23/0415* (2013.01); *C22B 58/00* (2013.01)

(58) Field of Classification Search
CPC ... C22B 3/1625; C22B 3/165; C22B 23/0492; C22B 23/0446; C22B 23/04; C22B 15/0067; C22B 15/0078; C22B 58/00; C22B 7/006; C22B 7/008; C22B 7/02; C22B 7/04
See application file for complete search history.

(56) References Cited

U.S. PATENT DOCUMENTS

| | | |
|---|---|---|
| 1,278,854 A | 9/1918 | Christensen |
| 2,242,217 A | 5/1941 | Amenabar |
| 4,654,078 A | 3/1987 | Perez et al. |
| 10,487,374 B2 | 11/2019 | Dahal |
| 2006/0193762 A1 | 8/2006 | Misra et al. |
| 2014/0127096 A1 | 5/2014 | Komon et al. |
| 2015/0125367 A1* | 5/2015 | Wyrsta ............... C22B 3/28 423/165 |
| 2016/0053342 A1 | 2/2016 | Dahal |
| 2017/0009318 A1 | 1/2017 | Buban et al. |
| 2018/0051050 A1 | 2/2018 | Pemberton et al. |

FOREIGN PATENT DOCUMENTS

| | | |
|---|---|---|
| KR | 10-2017-0002641 | 1/2017 |
| WO | 2001-089670 | 11/2001 |
| WO | 2019055766 A1 | 3/2019 |

OTHER PUBLICATIONS

PCT Search Report & Written Opinion for PCT/US2018/051050 in the name of Lixivia, Inc. dated Jan. 7, 2019 (17 pages).

* cited by examiner

*Primary Examiner* — Steven J Bos
(74) *Attorney, Agent, or Firm* — Fish IP Law, LLP (57) ABSTRACT

Compositions and methods are provided that provide recovery of metals such as copper, nickel, cobalt, indium, and other metals are recovered from mine tailings, in situ ore bodies, or postconsumer waste. An amine-containing lixiviant is utilized to generate an aqueous solution of the desired metal from insoluble salts present in the source material. Metals can be recovered and further purified by various processes, including extraction into an immiscible organic solvent, electrowinning, crystallization, and chemical reduction. Spent lixiviant can be regenerated and recycled back into the metal recovery process.

19 Claims, 4 Drawing Sheets

METHODS FOR RECOVERING COPPER, COBALT, INDIUM AND NICKEL WITH AMINE CONTAINING LIXIVIANT

This application claims the benefit of U.S. Provisional Application No. 62/558,785, filed on Sep. 14, 2017. These and all other referenced extrinsic materials are incorporated herein by reference in their entirety. Where a definition or use of a term in a reference that is incorporated by reference is inconsistent or contrary to the definition of that term provided herein, the definition of that term provided herein is deemed to be controlling.

FIELD OF THE INVENTION

The field of the invention is recovery of copper group elements from ores and other mixtures, particularly copper, cobalt, nickel, or indium.

BACKGROUND

The background description includes information that may be useful in understanding the present invention. It is not an admission that any of the information provided herein is prior art or relevant to the presently claimed invention, or that any publication specifically or implicitly referenced is prior art.

The metals copper, cobalt, nickel, and indium are used in a wide variety of applications and products. Copper is widely used for production of conductive wire and is essentially ubiquitous in electronic devices and electric motors, in addition to finding use in pigments and anti-fouling compounds for marine use. Cobalt is utilized in certain high-temperature alloys, in catalysts, in certain pigments, and in the production of lithium ion batteries. Nickel is a vital component of many types of batteries, and is also used in catalysts, alloys and fuel cell electrodes. Finally, indium is widely used in electronic components—in particular LCD displays. As such there is considerable demand for these metals.

Currently, copper, cobalt, and nickel are generally recovered from related ores and minerals. For example, copper is typically recovered from ores carrying chalcopyrite, chalcocite, bornite, tetrahedrite, or enargite. Cobalt is typically recovered from ores carrying cobaltite, carrollite, and linnaeite, which are often associated with copper-bearing ores. Nickel is typically recovered from ores carrying pentlandite, pyrrhotite, and chalcopyrite, some of which also include copper. There are relatively few indium minerals, and significant concentrations of them that are economically suitable for extraction have not been identified. As a result indium is generally recovered in trace amounts from copper-bearing ores as a byproduct of smelting.

While conventional sources and processes can provide copper, cobalt, nickel, and indium, increasing demands, depletion or lack of availability of high concentration ores, and environmental concerns provide a demand for recovery of these metals from unconventional sources or without relying on smelting operations.

For example, Great Britain Patent No. 190217617, to Mennicke, describes recovering copper from ashes and tailing by mixing the copper-containing material with an equimolar amount of molten bisulfate, then treating the resulting material with water to recover the copper as soluble copper sulfate. Unfortunately, such an approach requires handling of large amounts of molten bisulfate at highly elevated temperatures. U.S. Pat. No. 1,278,854, to Christensen, describes recovering copper from copper-bearing ores using a sulfur dioxide lixiviant. U.S. Pat. No. 2,242,217, to Amenabar, describes a similar process utilizing sulfuric acid as a lixiviant and recovery of the resulting copper sulfate using sulfur dioxide in the presence of a halogen. The required use of sulfur dioxide is a large detractor as it has a strongly unpleasant odor and forms corrosive sulfurous acid on reacting with water.

Thus, there is still a need for processes, systems, and methods that can safely and effectively recover metals such as copper, cobalt, nickel, and/or indium from various materials.

SUMMARY OF THE INVENTION

The inventive subject matter provides compositions and methods for the recovery of copper and other metals from mine tailings and other low-value sources. A lixiviant is used to extract copper in the form of a soluble copper:lixiviant complex, from which the metal is readily recovered.

One embodiment of the inventive concept is a method for recovering a metal (e.g. copper, cobalt, indium, and/or nickel) by obtaining a source material that includes an insoluble salt of the metal, contacting the source material with an amine-containing lixiviant to generate a soluble salt of the metal, and recovering a solution that includes the soluble salt of the metal. The metal can be recovered from this solution, for example by chemical or electrochemical reduction, crystallization, and/or by formation of an insoluble salt of the metal (for example by the addition of carbon dioxide, a carbonate, a sulfide, a phosphate, and/or a phosphide). In some embodiments formation of the insoluble salt is accompanied by regeneration of the amine-containing lixiviant.

Suitable lixiviant compounds include compounds having the following formula $$N_y, R_1, R_2, R_3, H\text{-}Xz \qquad \text{Formula 1}$$

where N is nitrogen, H is hydrogen, $R_1$, $R_2$, and $R_3$ are hydrogen or an organic group, and X is a counterion. The counterion can be a halide anion, an anion derived from a mineral acid, or an anion derived from an organic acid. The organic group can be a hydrocarbon, an alcohol, an ether, a thioether, an aldehyde, and/or a ketone. The lixiviant can be provided in amounts that are approximately (i.e. within ±10%) stoichiometric relative to the quantity of metal in the source material, in excess (i.e. superstoichiometric) relative to the quantity of metal in the source material, or substoichiometric relative to the quantity of metal in the source material.

Suitable source materials for methods of the inventive concept include mine tailings, in situ ore bodies, and post-consumer materials (such as a battery, battery component, or an e-waste). Where the source material is an in situ ore body a method of the inventive concept can include an additional step of injecting the lixiviant into the in situ ore body. Some embodiments include an addition step of extracting a contaminant (such as an alkaline metal or an alkaline earth) from the source material prior to the step of contacting with the amine-containing lixiviant.

In some embodiments of the inventive concept the method can include an additional step extracting a second metal from the treated source material following extraction of the first metal. Typical second metals is include platinum group metals, group 3a metals, and metalloids.

Various objects, features, aspects and advantages of the inventive subject matter will become more apparent from the following detailed description of preferred embodiments, along with the accompanying drawings and figures in which like numerals represent like components.

BRIEF DESCRIPTION OF THE DRAWINGS

FIG. 1.

FIGS. 2A and 2B.

FIG. 3.

FIG. 4.

FIG. 5.

DETAILED DESCRIPTION

The inventive subject matter provides apparatus, systems, and methods in which copper, nickel, cobalt, indium (i.e. copper group metals) and other metals are recovered from minerals and other sources, for example tailings from copper mining, using an amine-containing lixiviant. The resulting metals can be further purified and separated using conventional hydrometallurgical or electro-processes. Various objects, features, aspects and advantages of the inventive subject matter will become more apparent from the following detailed description of preferred embodiments.

One should appreciate that the disclosed techniques provide many advantageous technical effects, including recovery of copper, cobalt, nickel, and/or indium from mine tailings, waste ponds, and/or industrial wastes using scalable processes employing lixiviant consumption.

The following description includes information that may be useful in understanding the present invention. It is not an admission that any of the information provided herein is prior art or relevant to the presently claimed invention, or that any publication specifically or implicitly referenced is prior art. As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The inventors have discovered a method of recovering copper, cobalt, nickel, and indium from mine tailing and other non-optimal sources using amine-containing salts as lixiviants. Amine-containing lixiviants of the inventive concept include one or more amines with the general formula shown in Formula 1, where N is nitrogen, H is hydrogen, R1 to R3 are hydrogen or an organic group, and X is a counterion (i.e., a counter anion).

$$N_y, R_1, R_2, R_3, H\text{-}X_z \qquad \text{Formula 1}$$

Suitable counterions can be any form or combination of atoms or molecules that produce the effect of a negative charge. Counterions can be halides (for example fluoride, chloride, bromide, and iodide), anions derived from mineral acids (for example nitrate, phosphate, bisulfate, sulfate, silicates), anions derived from organic acids (for example carboxylate, citrate, malate, acetate, thioacetate, propionate and, lactate), organic molecules or biomolecules (for example acidic proteins or peptides, amino acids, nucleic acids, and fatty acids), and others (for example zwitterions and basic synthetic polymers). Suitable organic groups are carbon-containing moieties that include hydrocarbons, alcohols, ethers, thioethers, aldehydes, and ketones. For example, monoethanolamine hydrochloride (MEA.HCl, $HOC_2H_4NH_3Cl$) conforms to Formula 1 as follows: one nitrogen atom (N1) is bound to a carbon atom (R1=$C_2H_5O$) and 3 hydrogen atoms (R2, R3 and H), and there is one chloride counteranion (X1=Cl—). In another example, ammonium chloride ($NH_4Cl$) conforms to Compound 1 as follows: one nitrogen atom (N1) is bound to 4 hydrogen atoms (R1, R2, R3, and H) and there is one chloride counterion (X1=Cl—). Amine-containing salts suitable for the extraction of copper group metal elements (for example from copper, cobalt, nickel, and/or indium-containing mine tailings, and other materials) can have a pKa of about 7 or about 8 to about 14, and can include protonated ammonium salts (i.e., not quaternary). Examples of suitable amine-containing salts for use in lixiviants include salts of weak bases such as ammonia, nitrogen-containing organic compounds (for example monoethanolamine, diethanolamine, triethanolamine, morpholine, ethylene diamine, diethylenetriamine, triethylenetetramine, methylamine, ethylamine, propylamine, dipropylamines, butylamines, diaminopropane, triethylamine, dimethylamine, and trimethylamine), low molecular weight biological molecules (for example glucosamine, amino sugars, tetraethylenepentamine, amino acids, polyethyleneimine, spermidine, spermine, putrescine, cadaverine, hexamethylenediamine, tetraethylmethylenediamine, polyethyleneamine, cathine, isopropylamine, and a cationic lipid), biomolecule polymers (for example chitosan, polylysine, polyornithine, polyarginine, a cationic protein or peptide), and others (for example a dendritic polyamine, a polycationic polymeric or oligomeric material, and a cationic lipid-like material), or combinations of these. Compounds having the general formula shown in Compound 1 can have a wide range of acidities, and an amine-containing salt of the inventive concept can be selected on the basis of its acidity so that it can selectively react with one or more copper, cobalt, nickel, and indium-containing salts, sulfides, and/or oxides. Such a compound, when dissolved in water or another suitable solvent, can (for example) effectively extract copper, cobalt, nickel, and/or indium from copper mine tailings or similar materials.

Waste products from conventional mining processes can serve as suitable source materials for methods of the inventive concept. Similarly, ore deposits (for example, low grade ores) and/or post-consumer waste (e.g. batteries, e-waste, etc.) can serve as suitable source materials. Mine tailings (e.g. suspensions and/or particulates from tailings ponds) and similar materials can include copper, cobalt, nickel, and indium—often in the form of oxides. Using an amine-containing lixiviant (for example ammonium chloride, monoethylamine acetate, and/or other organic compounds that include an amine) such metals can be extracted from such mine tailings as a soluble salt. For example, copper can be solvated from mine tailings using ammonium acetate in the presence of acetic acid, and copper recovered from the dissolved copper salt by electrowinning or electroextraction. Ammonium acetate lixiviant is regenerated in the electrowinning reaction. The primary reactions in this exemplary process are shown in Scheme 1.

salts of these metals. In some embodiments, copper or other metals can be recovered by electrochemical methods (such as electrowinning or electroplating) at step (a). The amine-containing lixiviant can be regenerated in such a process by the addition of an acid (such as acetic acid), and step (b) omitted. In other embodiments copper or other metals can be recovered at step (b) by collecting a relatively insoluble metal salts. In some embodiments both electrochemical and precipitating methods can be used, for example in order to optimize yield and/or selectively recover different metals (see below).

In some embodiments metals can be recovered by the addition of a precipitant to the aqueous solution containing soluble metal:lixiviant complexes. Such precipitants cause the formation of insoluble salts of the metal to be recovered (which can be recovered by methods such as centrifugation, settling, filtration, etc.), and can also serve to regenerate the lixiviant. Suitable precipitants include carbon dioxide, bicarbonate salts, carbonate salts, a sulfide, a phosphate, and/or a phosphide.

In still other embodiments the desired metal (e.g. copper) can be recovered by crystallization of metal salts. For example, solvent can be removed (for example, by evaporation) until crystals of the desired metal salt are formed. Such crystals are readily separable from the surrounding solution, and can provide a high purity (i.e. 90% or greater) form of the desired metal. Such crystallization processes can be aided by the addition of seed crystals or other suitable nucleation centers.

Figure 1:
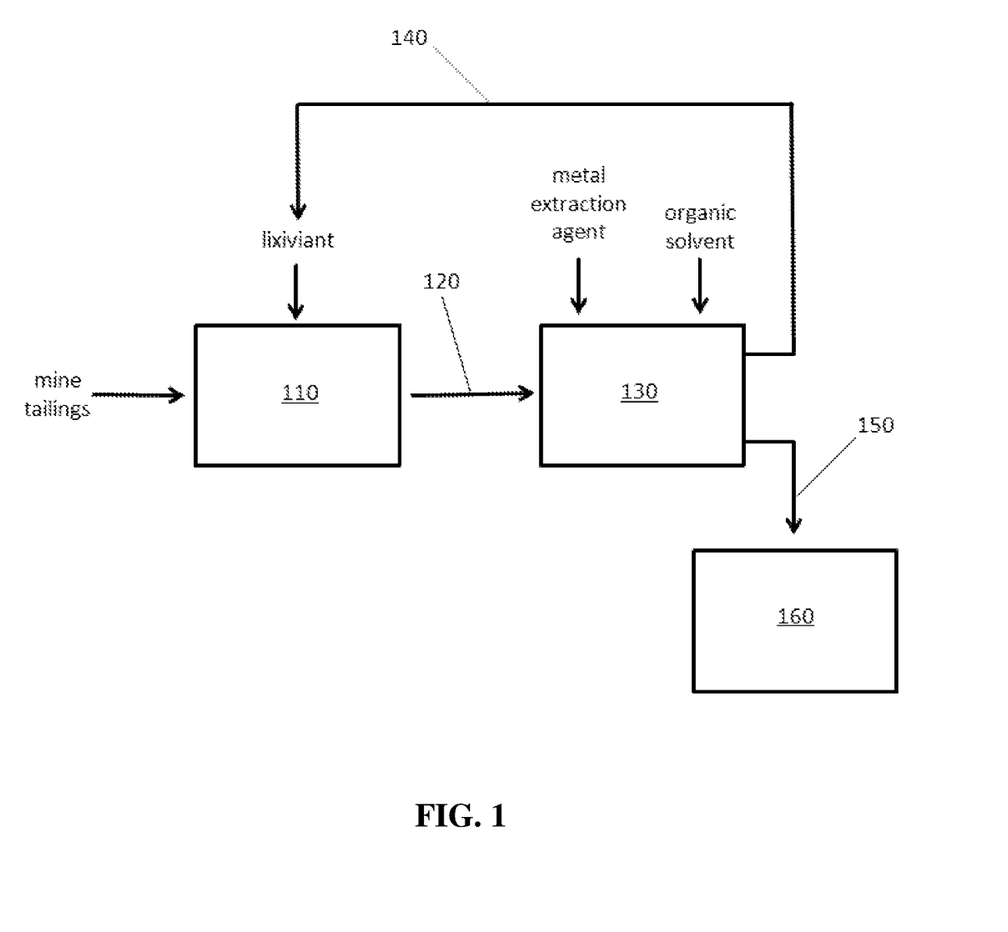
FIG. 1 schematically depicts a method of the inventive concept, in which copper is extracted from mine tailings in a first reactor and copper content of the aqueous copper solution so generated is extracted into an organic phase for recovery of copper metal. Spent lixiviant retained in the aqueous phase can be recycled into the initial extraction step of the process.

As shown in FIG. 1, in some embodiments of the inventive concept the reactions in Scheme 1 are divided in two consecutive reactors, separating extraction and precipitation or electrowinning steps. In some embodiments the solution of solubilized metal complexes, such as a soluble copper salt, can be further subject to solvent extraction processes. As shown, a suitable source material (such as mine tailings) can be contacted with a lixiviant in an extraction reactor 110, resulting in extraction of copper as an aqueous solution containing a water-soluble copper salt 120. This aqueous solution is transferred to a second reactor 130, where it is mixed with a metal extraction agent capable of forming organic-soluble complexes with copper ions and contacted with an immiscible organic solvent. The resulting copper complexes are extracted into the immiscible organic solvent, while the lixiviant remains in the aqueous phase. This lixiviant-containing aqueous phase 140 can be transferred back to the initial extraction reactor 110 to provide an at least Scheme 1

While ammonium acetate is shown as the lixiviant in scheme 1, it should be appreciated that other lixiviant species (e.g. monoethylamine acetate, monoethanolamine acetate, etc.) can be used. Such lixiviant species can be selected to have higher vapor pressures than analogous ammonium salts, thereby reducing losses due to vaporization and mitigating environmental contamination.

It should also be appreciated that while copper oxide is depicted in Scheme 1, cobalt, nickel, and/or indium oxides are similarly reactive in analogous reactions. Similarly, copper, cobalt, nickel, and/or indium sulfides can undergo analogous reactions with amine lixiviants to provide soluble partially closed process. In some embodiments the lixiviant content of the lixiviant-containing aqueous phase is regenerated (for example, by the addition of a mineral acid) prior to being returned to the initial extraction reactor. The copper-containing organic phase 150 can be transferred to a copper reclamation reactor 160, where copper metal can be recovered by electrowinning, electroplating, chemical reduction, or any suitable process. In some embodiments the copper content of this organic phase can be transferred back into an aqueous phase in order to facilitate recovery of copper metal. In some embodiments at least a portion of the metal extraction agent can be recovered from the copper reclamation reactor and recycled to the second reactor 130 in order to provide further material savings. Such solvent extraction have a number of advantages, including at least ready adoption into existing metal production circuits, allowance for additional purification of the extracted metal, and concentration of the solubilized metal prior to electrowinning.

In some embodiments of the inventive concept the source material can be an ore body. In such embodiments a lixiviant solution can be used to extract metal from insoluble metal salts of the ore body while it is in situ, for example by pumping the lixiviant solution to bring it into contact with the ore body and later recovering the metal:lixiviant complexes as an aqueous solution obtained from the treated ore body. In such an embodiment the ore body itself essentially acts as the extraction reactor. Metal (such as copper) can subsequently be recovered from this solution by electrowinning, reduction, and/or extraction into an organic solvent as described.

As shown in Scheme 1, ammonium acetate can be utilized in stoichiometric amounts (2 moles $RNH_3^+$ per mole $Cu^{2+}$ for charge equivalency) relative to the reactive copper in the mine tailings or similar waste materials. In other embodiments superstoichiometric (i.e. greater than 2 moles $RNH_3^+$ per mole $Cu^{2+}$ or similar metal) or substoichiometric (i.e. less than 2 moles $RNH_3^+$ per mole $Cu^{2+}$ or similar metal) amounts of the amine-containing lixiviant can be used. It should be appreciated that regeneration of the lixiviant species enables the use of such substoichiometric amounts of lixiviant, providing a pseudocatalytic activity that reduces the cost and environmental impact of the use of lixiviant species. Alternatively, in some instances the use of super-stoichiometric amounts of lixiviant can be used to accommodate the content and/or particle size of a particular source material or provide more rapid or complete extraction of a desired metal. In such superstoichiometric applications regeneration and recycling of the lixiviant species serves to reduce overall consumption.

In other embodiments of the inventive subject matter, the reactions depicted in Scheme 1 can occur simultaneously in one reactor. In embodiments of the inventive concept the amine-containing salt is used in substoichiometric amounts relative to the copper group metal available in the source material (for example, copper mine tailings). In some embodiments, the amine-containing salt is used at a 1:1 molar ratio relative to the available copper group metal (for example, 1 mole $NH_4+$ per mol $Cu^{2+}$). In other embodiments the amine-containing salt is used at a 1:2 molar ratio relative to the available copper group metal (for example, 1 mole $RNH_3+$ per 2 moles $Cu^{2+}$). In still another embodiment, the amine-containing salt is used at a 1:5 or lower molar ratio relative to the available copper group metal (for example, less than or equal to 1 mole $RNH_3^+$ per 5 mole $Cu^{2+}$). This reduction in the use of amine-containing salt greatly reduces expenses related to copper group metal production. In other embodiments super stoichiometric amounts of amine containing lixiviant may be used to extract copper group metals from ores, tailings, waste products and other sources. For example, 3 moles of amine ($RNH_3^+$) per 1 mole of $Cu^{2+}$, where R can be a variety of moieties.

Using simple fractionation methods such as gravitational settling, de-silting or treatment using a centrifugal separator (for example, a hydrocyclone), dewatering units, filter presses, and similar equipment the water-soluble copper group metal complex can be separated from the larger and/or denser ore, mine tailing or waste particles, which permits recycling of such mine tailings without causing accumulation of impurities in the process.

As shown in Scheme I, an amine lixiviant can be regenerated during reactions that liberate copper and other metals from treated materials. In some embodiments this regeneration permits the use of sub-stoichiometric amounts (relative to the amount of available copper or other metal in the material to be treated) of the amine lixiviant. For example, moles of amine lixiviant used in extraction can be about 99%, 95%, 90%, 80%, 70%, 60%, 50%, 40%, 30%, 20%, 10%, 5%, 2%, 1%, or less than 1% of moles of copper, cobalt, nickel, indium, and/or other copper group metals available in an amount of material being extracted. In some embodiments only a trace amount amine lixiviant is sufficient for efficient recovery of the desired metal. In such embodiments regeneration (for example, by the addition of a strong or weak acid) can be carried out simultaneously with extraction rather than by a step-wise process.

Although extracted metals can be recovered by precipitation or crystallization (such as by forming relatively insoluble salts), it should be appreciated that copper, cobalt, nickel, and/or indium can be recovered by other means once solubilized from materials such as mine tailings using an amine lixiviant. For example, copper, cobalt, nickel, and/or indium can be recovered by chemical and/or electrochemical reduction to provide the element in metallic form. Processes such as reaction with chemical reductants (which can generate metal particle suspensions), electroplating, and electrowinning are suitable for this purpose.

In some embodiments, differences in reduction potential can be utilized to selectively recover two or more metals from the same material. In such a process a suitable source material can be extracted with an amine lixiviant to generate a solution containing high reduction potential metal ion (such as calcium) and a different, lower reduction potential metal ion (such as copper). The lower reduction potential metal can be selectively recovered by electrowinning or electroplating, leaving the high reduction potential metal in solution. The high reduction potential metal ion can subsequently be recovered by other means, for example precipitation to form an insoluble salt (e.g. by treatment with $CO_2$ or carbonate).

It should also be appreciated that once a soluble copper group metal-lixiviant complex has been formed a variety of traditional metal recovery processes can be applied to recover the metal, and that methods of the inventive concept are not limited to use with mine tailings and other waste materials. For example, a mine site can include an ore body underground. The metal content of such an ore body can be recovered via in situ mining, e.g. by injecting a solution of an amine-based lixiviants into the underground ore body and then recovering the resulting solution (which contains the desired copper group metal) as a pregnant leach solution (PLS). This PLS can then be further processed using conventional solvent exchange (SX) techniques and chemicals. Such in situ extraction can improve the concentration of the desired metal in the downstream electrowinning operations. Application of a solvent extraction process to such a PLS can also serve to improve the purity of the metal in solution. Once the metal is in the non-polar SX solution it can be stripped, typically using an acid (e.g. sulfuric acid) to generate a highly concentrated aqueous solution of the metal, which can then be subjected to electrowinning.

EXAMPLES

Figure 2A:
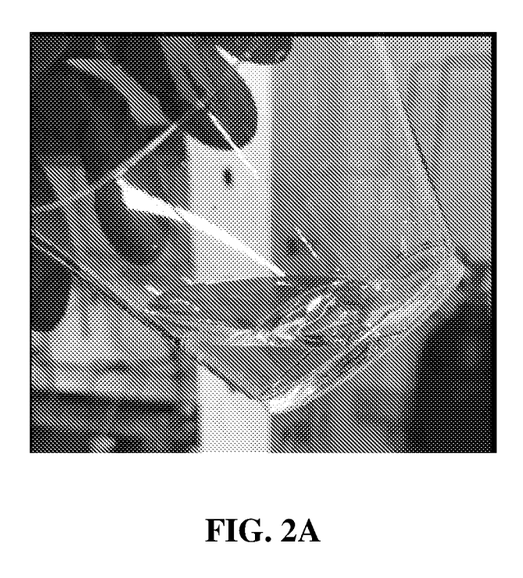
FIG. 2A provides a photograph of copper extracted from copper mine tailings as a soluble salt using an amine-containing lixiviant.

FIG. 2A provides a photograph of a solution produced by contacting copper mine tailings obtained from a Chilean tailing pond with a solution of amine-containing lixiviant.

Figure 3:
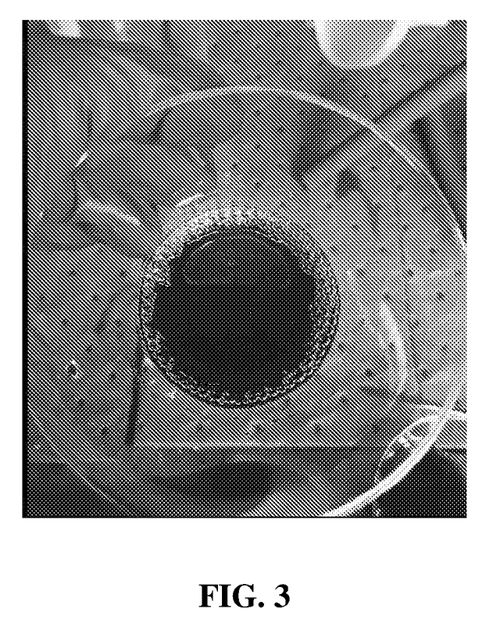
FIG. 3 provides a photograph of the results of reduction of the copper solution shown in FIG. 2A. Reduction produces metallic copper in the form of particulates, which appear as a dark precipitate.

The solution has the characteristic color of a solubilized copper salt. FIG. 3 provides a photograph of copper metal produced by reduction of copper extracted as a soluble salt from Chilean mine pond tailings using an amine-containing lixiviant. Such reduction leads to the formation of particles of copper metal, which have the appearance of a dark precipitate.

Figure 4:
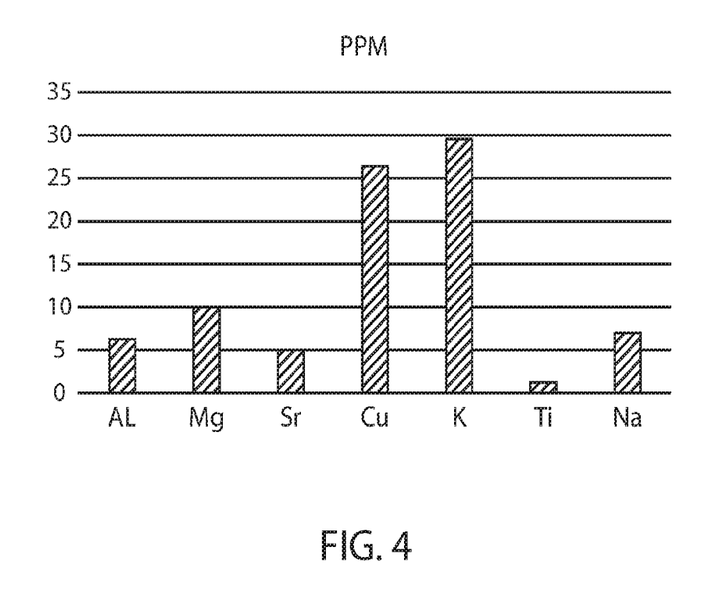
FIG. 4 shows the results of elemental analysis of the solution shown in FIG. 2A.

FIG. 4 provides the results of elemental analysis of the copper solution shown in FIG. 2A. As shown, copper is selectively solvated relative to metals such as aluminum, magnesium, strontium, and titanium present in the mine tailing sample. Inventors believe that it can be advantageous to reduce the alkaline metal (e.g. Na, K, etc.) and alkaline earth (e.g. Ca, Mg, etc.) content of the source material (e.g. copper mine tailings) by pre-treatment of source materials utilized in methods of the inventive concept. For example, copper mine tailings can be treated with alkaline metal selective and/or alkaline earth selective lixiviants (such as selected amine-containing lixiviants) in order to reduce the content of these elements prior to extraction of copper, cobalt, nickel, and/or indium in order to improve product purity. In such a process copper mine tailings or similar materials can be treated sequentially with different lixiviants (or, alternatively, different concentrations of the same lixiviant) to recover potentially valuable alkaline metal and/or alkaline earth elements prior to extraction of copper group metals, platinum group metals, group 3a metals, and/or other metals or metalloids.

Figure 2B:
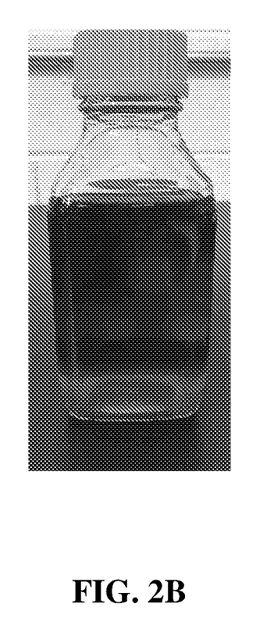
FIG. 2B provides a photograph of copper:lixiviant complexes in aqueous solution following extraction. The solutions have the characteristic blue/green colors of aqueous copper salt solutions.
Figure 5:
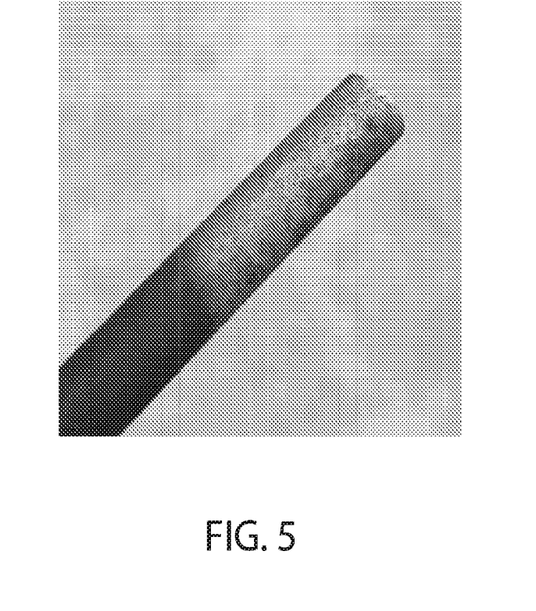
FIG. 5 provides a photograph of an electrode partially coated with electrowon copper obtained from the solution shown in FIG. 2B.

As noted above, metals can be recovered from aqueous solution in the presence of lixiviant by electrowinning. FIG. 2B shows an example of a relatively concentrated solution of copper:lixiviant complex in aqueous solution. FIG. 5 shows a portion of an electrode used in an electrowinning process applied to such an aqueous solution, where the electrode is partially covered in copper metal. This demonstrates that the presence of a lixiviant does not interfere with electrowinning/electroplating methods for metal recovery.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A method of recovering a first metal, comprising:
   obtaining a source material selected from the group consisting of a mine tailing, an in situ ore body, and postconsumer waste, wherein the source material comprises an insoluble salt of a first metal;
   contacting the source material with a lixiviant comprising an amine-continuing compound and a counterion and with an acid form of the counterion to generate a soluble salt of the first metal;
   recovering a solution comprising the soluble salt of the first metal,
   wherein the first metal is selected from the group consisting of copper, cobalt, indium, and nickel; and
   regenerating the lixiviant.

2. The method of claim 1, comprising the additional step of recovering the first metal from the solution.

3. The method of claim 2, wherein recovering the first metal is performed by chemical or electrochemical reduction.

4. The method of claim 2, Wherein recovering the first metal is performed by crystallization.

5. The method of claim 2, wherein recovering the first metal is performed by formation of an insoluble salt comprising the first metal.

6. The method of claim 5, wherein regenerating the amine-containing lixiviant occurs on formation of the insoluble salt.

7. The method of claim 5, wherein recovering the first metal is performed by contacting the solution with a precipitant selected from the group consisting of carbon dioxide, a carbonate, a sulfide, a phosphate, and a phosphide.

8. The method of claim 1, wherein the lixiviant is a compound represented by Formula 1:

$$N_y, R_1, R_2, R_3, H\text{-}X_z \qquad \text{Formula 1}$$

wherein N is nitrogen, y represents the number of nitrogen present in the lixiviant, H is hydrogen, $R_1$, $R_2$ and $R_3$ are hydrogen or an organic group, X is a counterion, and z represents the number of counterions present in the lixiviant.

9. The method of claim 8, wherein the counterion is selected from the group consisting of a halide anion, an anion derived from a mineral acid, or an anion derived from an organic acid.

10. The method of claim 8, wherein the organic group is selected from the group consisting of a hydrocarbon, an alcohol, an ether, a thioether, an aldehyde, and a ketone.

11. The method of claim 1, wherein the lixiviant is provided in a quantity that is superstoichiometric relative to that of the metal.

12. The method of claim 1, comprising an additional step of extracting a contaminant from the source material prior to the step of contacting with the amine-containing lixiviant.

13. The method of claim 12, wherein the contaminant comprises an alkaline metal or an alkaline earth.

14. The method of claim 1, wherein the source material is an in situ ore body, comprising the additional step of injecting the lixiviant into the in situ ore body.

15. The method of claim 1, wherein the source material is post-consumer waste comprising a battery component or an e-waste.

16. The method of claim 1, comprising the additional step of extracting a second metal from the source material following extraction of the first metal.

17. The method of claim 16, wherein the second metal is selected from the group consisting of a platinum group metal, a group 3a metal, and a metalloid.

18. The method of claim 1, comprising regenerating the lixiviant and the acid form of the counterion by electrowinning.

19. The method of claim 1, comprising regenerating the lixiviant by addition of the acid form of the counterion.

* * * * *

UNITED STATES PATENT AND TRADEMARK OFFICE
CERTIFICATE OF CORRECTION

PATENT NO. : 11,566,304 B2
APPLICATION NO. : 16/647337
DATED : January 3, 2023
INVENTOR(S) : Michael D Wyrsta It is certified that error appears in the above-identified patent and that said Letters Patent is hereby corrected as shown below:

In the Claims

At Column 9, Line 62, change, "an amine-continuing compound" to --an amine-containing compound--

At Column 10, Line 11, change, "The method of claim 2, Wherein" to --The method of claim 2, wherein--

Signed and Sealed this
Sixteenth Day of May, 2023

Katherine Kelly Vidal
Director of the United States Patent and Trademark Office